(12) United States Patent
Levi et al.

(10) Patent No.: US 7,720,961 B2
(45) Date of Patent: May 18, 2010

(54) MANAGED AFFILIATE SYSTEM AND METHOD

(75) Inventors: Ron Levi, Calabasas, CA (US); Greg Piccionelli, Los Angeles, CA (US)

(73) Assignee: XWeb, Inc., Carson City, NV (US)

( * ) Notice: Subject to any disclaimer, the term of this patent is extended or adjusted under 35 U.S.C. 154(b) by 1445 days.

(21) Appl. No.: 11/029,095

(22) Filed: Jan. 3, 2005

(65) Prior Publication Data

US 2005/0177844 A1 Aug. 11, 2005

Related U.S. Application Data

(60) Provisional application No. 60/534,639, filed on Jan. 7, 2004.

(51) Int. Cl.
*G06F 15/173* (2006.01)

(52) U.S. Cl. ............... 709/224; 709/223; 709/225; 709/226; 709/229

(58) Field of Classification Search ......... 709/223–226, 709/229; 705/14, 26
See application file for complete search history.

(56) References Cited

U.S. PATENT DOCUMENTS

| 7,117,260 B2* | 10/2006 | Bimson et al. ............ 709/223 |
| 7,162,429 B1* | 1/2007 | Delgado et al. ............. 705/1 |
| 7,409,352 B1* | 8/2008 | Delgado et al. ............. 705/1 |
| 2002/0029290 A1* | 3/2002 | Burema et al. ............ 709/238 |
| 2002/0046244 A1* | 4/2002 | Bimson et al. ............ 709/205 |
| 2002/0055880 A1* | 5/2002 | Unold et al. ............... 705/26 |
| 2003/0014331 A1* | 1/2003 | Simons .................... 705/27 |
| 2004/0019634 A1* | 1/2004 | Van Geldern et al. ....... 709/203 |
| 2004/0107365 A1* | 6/2004 | Hogg .................... 713/201 |
| 2006/0259778 A1* | 11/2006 | Gudorf et al. ............ 713/186 |
| 2008/0120156 A1* | 5/2008 | Nusbaum ................. 705/7 |
| 2008/0134287 A1* | 6/2008 | Gudorf et al. ............. 726/2 |
| 2008/0275822 A1* | 11/2008 | Delgado et al. ........... 705/80 |

* cited by examiner

*Primary Examiner*—Shawki S Ismail
(74) *Attorney, Agent, or Firm*—Gates & Cooper LLP

(57) ABSTRACT

Embodiments of the present invention are directed to a managed affiliate system and method configured to provide authorized content for use and distribution. More specifically, embodiments of the present invention are directed to a managed affiliate system that is configured to verify and monitor whether the content or property offered for use or sale by a participant is in compliance with any use restrictions.

11 Claims, 6 Drawing Sheets

Top Domain ----- Unrestricted
Top Domain/First ----- Restricted
Top Domain/Second ----- Unrestricted

MANAGED AFFILIATE SYSTEM AND METHOD

RELATED APPLICATIONS

This application is related to U.S. Provisional Application, entitled Managed Affiliate System and Method, Ser. No. 60/534,639 filed Jan. 7, 2004, and is fully incorporated herein by reference.

FIELD OF INVENTION

Wide area networks, such as the World Wide Web ("WWW") or Internet have provided numerous opportunities for the creation of new businesses and new marketplaces for the sale of goods and services. Due to the expansive nature of some wide area networks, such as the Internet, it is difficult to successfully market goods and services to users as literally millions of web sites exist and a user must know the name of the web site or search by topic for available listings. In light of the difficulties of reaching relevant consumers, on-line merchants have developed various marketing techniques to assist in their marketing efforts.

Some marketing techniques which have developed include traditional marketing modalities such as advertisements (banners and pop-up advertisements). Additionally, web site owners can include their web site listing in search engines in association with a list of descriptive terms which describe or are otherwise relevant to their web site such that a search utilizing one or more of the listed terms would cite the web site in the list of search results.

Although banner advertisements and pop-up advertisements can be effective, this form of advertising alone is limited in its ability to promote the advertised goods or services as it is more difficult to reach a desired type of consumer. Indeed, it is difficult to ascertain whether the advertisement is viewed by consumers interested in the promoted goods or services. Search engines provide users the ability to more quickly locate web sites bearing goods or services of interest. However, even a successful search will not guarantee that a user will find a specific web site as there are typically multiple listings of web sites in the search result list for any given search. Thus, placement in the search result list becomes of importance. Unfortunately, the placement of a web site in a search result list is dictated by many factors that can be controlled by other advertisers or web site owners seeking preferred placement in a listing, such that a web site perfectly matching the search request will not necessarily be placed at the top of the search list.

To solve the problem of reaching a targeted consumer, and more effectively focusing marketing efforts, referral marketing programs have evolved. One successful system has been the affiliate program. Affiliate programs are cooperative marketing programs between a provider of goods or services (hereinafter service or affiliate provider) and at least one participant or merchant (affiliate participant). In an affiliate program, the traffic (customers or users) of the participant's web site are encouraged to visit the service provider's web site via any suitable means, including, but not limited to, a pop-up advertisement, banner advertisement or direct transfer to the service provider's web site. Generally, a fee is offered for the successful referral of a user or client to the service provider's business, wherein a successful referral is established upon the sale of the provider's offered goods or services. Because a fee is offered for each successful transaction, the participant focuses its customers to the goods and services of the affiliate provider through the various advertising techniques. Further, participants of the affiliate programs usually have goods or services that are similar or related to the affiliate provider such that the customers of the member are more likely to be interested in the goods or services of the affiliate provider.

Although the affiliate marketing program has been highly successful in the marketing of the service provider's goods or services, it has created new potential for liability. Indeed, recent legal decisions have imposed liability on service providers for the actions or wrongdoings of the members in their affiliate program, including the maintaining of unauthorized content on their web site which is owned by third parties and used without permission.

In most instances, the service provider does not have any control over the actions of the member or the content on the web sites of the member. Nonetheless, the marketing connection between the member and the service provider has created a basis for the argument that vicarious liability may be imposed upon the service provider for wrongdoings of the affiliate member. For example, liability for infringement of copyright, trademark and patents has been asserted against service providers. This type of liability can result in millions of dollars in damages levied against a service provider.

A need in the industry exists for a managed affiliate program which provides authorized content and manages use rights of the provided content, such that a service provider can cooperate with merchants to receive potential customers with minimized risk of exposure to liability. A further need exists for the ability to identify non-compliant content or property associated with a merchant so as to allow the service provider the opportunity to avoid liability potentially created from the receipt of customers from a non-compliant merchant.

BRIEF DESCRIPTION OF THE DRAWINGS

The detailed description of embodiments of the invention will be made with reference to the accompanying drawings, wherein like numerals designate corresponding parts in the figures.

SUMMARY OF THE DISCLOSURE

Figure 1:
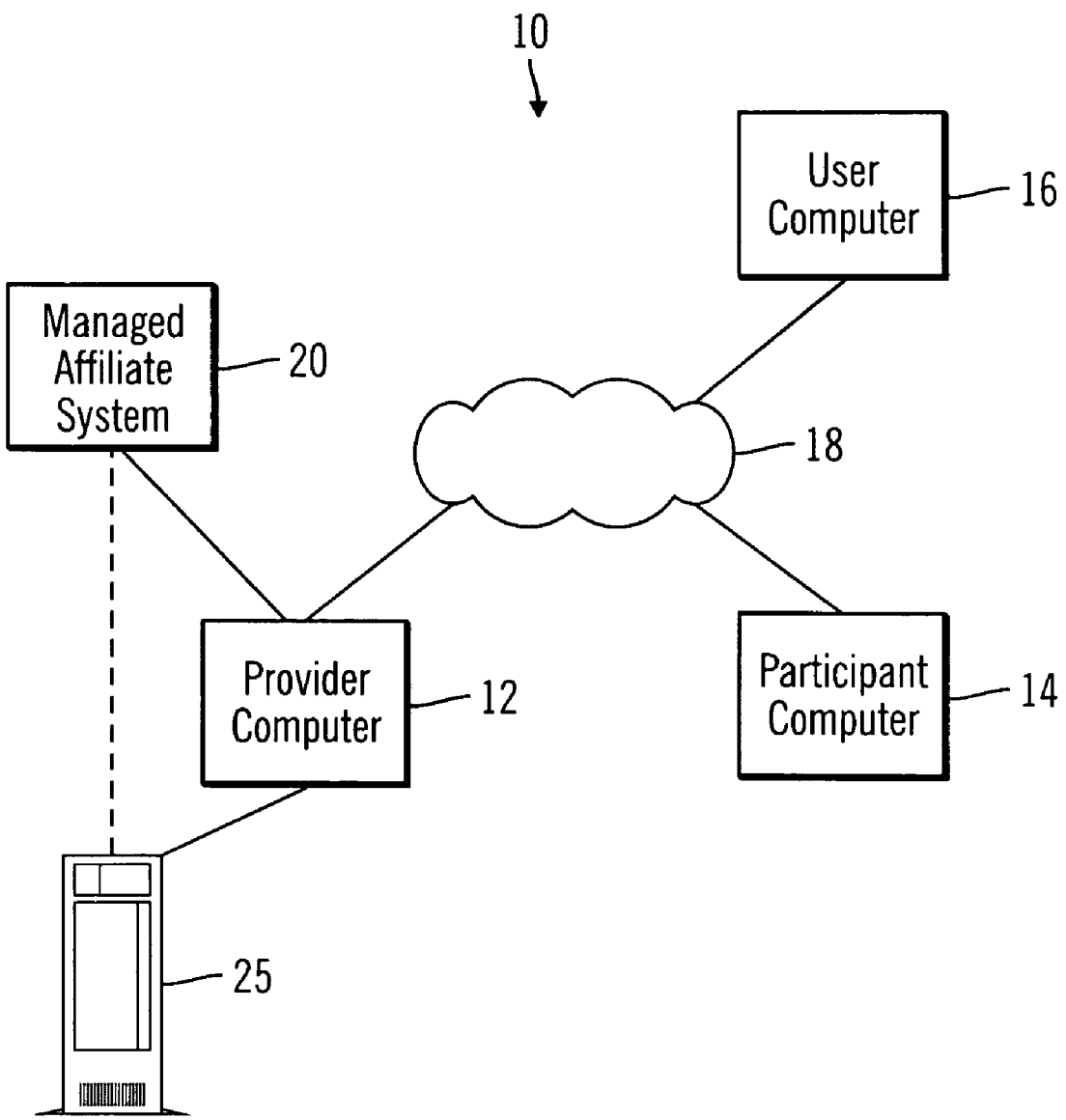
FIG. 1 is network system environment in accordance with embodiments of the invention.

Embodiments of the present invention are directed to a method and apparatus for providing an affiliate program on a computer network having a provider computer in communication with a participant computer having a participant web site, the method comprising preauthorizing a set of content for use by the affiliate program; prescreening the participant web site; and transferring at least a portion of the content to the participant computer. The affiliate system operated by such methods comprises a program manager configured to receive registration information from the participant computer, a content database coupled to the provider computer containing content approved for use on the participant computer; and a use rights manager coupled to the content database and being configured to control access of the user computer to the participant computer. Embodiments of the affiliate program further comprise a user computer in communication with the participant computer and affiliate program. The affiliate program is accessible to a user operating the user computer via the provider computer or participant computer, wherein a user accessing the affiliate program is prescreened to determine the eligibility of the user to access the content.

A feature of preferred embodiments of the invention is that the control of the domain name associated with a participant's web site can be transferred to the affiliate system. An advantage to this feature is that the affiliate system can terminate access to a web site having unauthorized content, thereby minimizing the provider's exposure to liability.

Another feature of preferred embodiments is that the content is pre-authorized by the affiliate system. An advantage to this feature is that potential liability to the affiliate system for the unauthorized use of content can be minimized. A further advantage is that the participant of the affiliate system minimizes potential liability due to unauthorized use of content.

A still further feature of preferred embodiments is that use restrictions are associated with the content. An advantage to this feature is that the affiliate system can more easily and efficiently verify the proper use of the content.

Another feature of preferred embodiments is that control software is downloaded to the participant's computer. An advantage to this feature is that the affiliate system is capable of monitoring whether any changes are made on the participating web sites. A further advantage to this feature is that the changes can be reviewed to minimize the risk that problematic content has been added to the web site.

A further feature of preferred embodiments is that the affiliate program prescreens the participant's web site. An advantage to this feature is that any problematic content can be identified prior to accepting the participant into the affiliate program, thereby minimizing potential liability for the provider of the affiliate program.

A still further feature of preferred embodiments is that the affiliate program prescreens the users and verifies the user's identification and age prior to allowing the user access to content in the affiliate program. An advantage to this feature is that the affiliate program can regulate the type of content presented to the user to minimize the distribution of content that is not in compliance with all use regulations, including user restrictions, governmental and criminal regulations.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

DETAILED DESCRIPTION OF EMBODIMENTS

Embodiments of the present invention are directed to a managed affiliate system configured to provide authorized content for use and distribution. More specifically, embodiments of the present invention are directed to a managed affiliate system that is configured to verify and monitor whether the content or property offered for use or sale by a participant is in compliance with any use restrictions placed on the property, regulations governing the use of the content, or appurtenant to the ownership of the property, such that the property is being legitimately offered by an affiliate member.

With reference to FIG. 1, embodiments of the present invention 10 operate on a network having a service provider, or provider computer 12, at least one participant or member computer 14, and at least one client or user computer 16, wherein the provider computer 12, member computer 14 and user computer 16 are all in electronic communication with each other via a communication link 18. The provider computer 12 may include one or more internal data storage devices (not shown) for storing content for communication to a participant computer 14 or a user computer 16. Alternatively, or in addition, the provider computer 12 may be coupled to an external data storage device, computer or other means, including third party storage devices, generally represented at 25, from which the provider computer 12 may obtain content for communication to a participant 14 or user computer 16. In preferred embodiments, there may be any combination of the number of provider computers 12, participant computers 14 and user computers 16. As the operation of a network computer system is well known by those skilled in the art, a more detailed discussion will not be set forth.

In embodiments of the present invention, a managed affiliate system 20 resides on, or is coupled to, the provider computer 12. Generally, the managed affiliate system 20 offers goods, which includes content and merchandise (collectively referred to as "content") or services via a web site, or a collection of web sites, including the content and services of third parties. The content and services are generally available to end users or consumers.

Embodiments of the managed affiliate system are configured to provide access to content that is legitimately owned or licensed and to prohibit the availability of unauthorized content, including content that is not compliant with governmental regulations, or criminal laws, such as record keeping and labeling requirements pursuant to 28 U.S.C. 2257 et seq., and 28 CFR 75 et seq. In this regard, in preferred embodiments, the participants populate their web sites with content made available by the managed affiliate system. By participating in the system, the participants are not required to verify the legitimacy of the content used on their web sites as the content can be selected from the approved content made available by the affiliate system. As the use of the content is already authorized, the participant can minimize the risk of liability resulting from the use of the content. For example, in some instances, the creation of derivative works by the participants can be permitted such that the participants can create their own banner advertisements, or combine works to create new content. In some embodiments, only content provided by the affiliate system can be offered on the participant's web site, thereby minimizing the risk of liability to the affiliate system.

Figure 2:
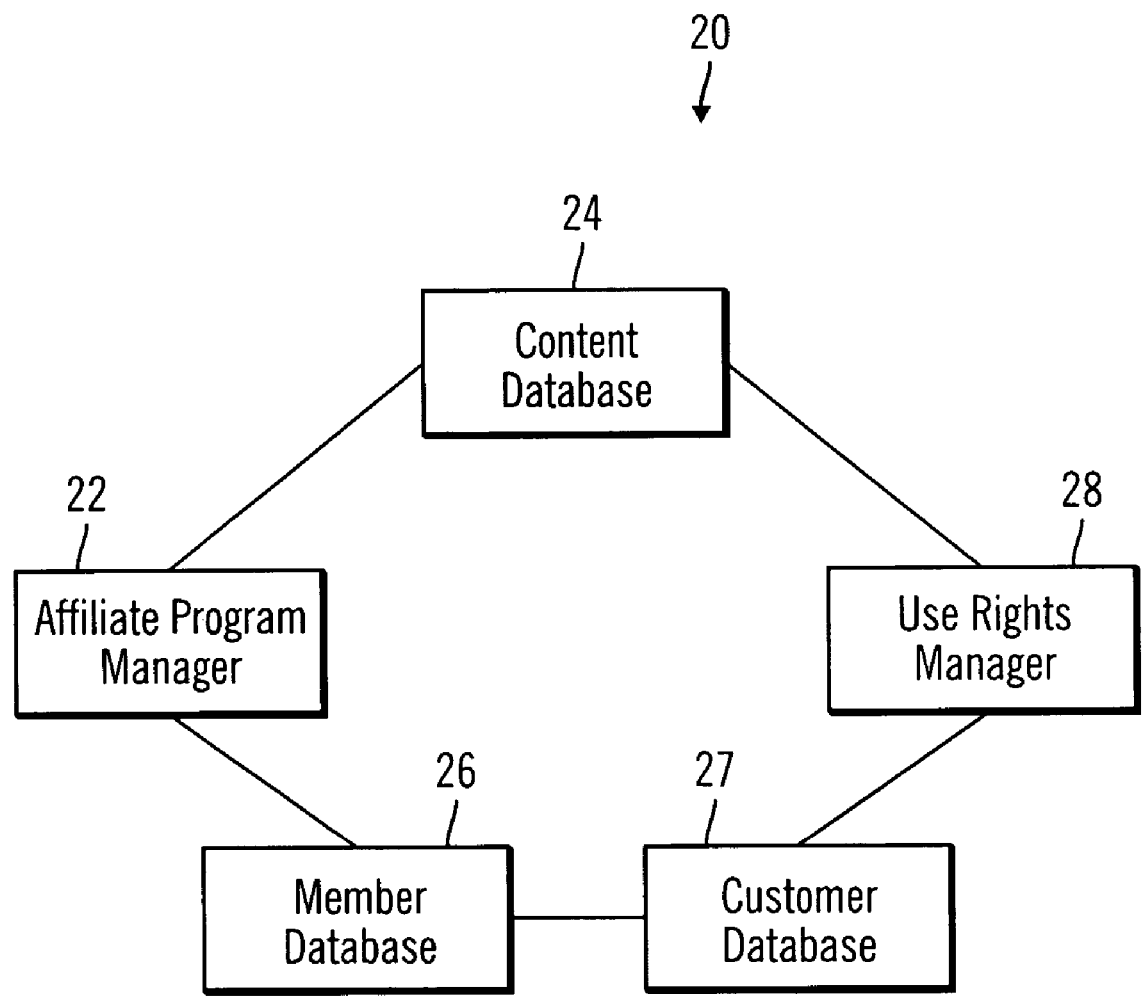
FIG. 2 is a schematic of a managed affiliate system in accordance with embodiments of the invention.

With reference to FIG. 2, preferred embodiments of the managed affiliate system 20 comprise an affiliate program manager 22, a content database 24, a membership database 26, a customer database 27, and a use rights manager 28. The affiliate program manager 22 is a software program that facilitates the collection and management of the content made available in the managed affiliate program. In preferred embodiments, the affiliate program manager 22 is configured to minimize the risk that the participant's web site is problematic and to increase the likelihood that the content or goods offered via the participant computer are legitimately owned or licensed, or otherwise in compliance with applicable laws, and thus, minimize claims of liability against the service provider resulting from the receipt of traffic from the participant. Further, the affiliate program manager can be configured to collect user information, including age, identification and payment information.

The content database 24 is a database containing information pertaining to the content. The content database 24 is stored on the internal or external storage medium 25 coupled to the provider computer 12, including, but not limited to, identification or title of the content, description of the content, size of file (if digital), weight of object (if physical), owner of the content, owner of the copyright, whether the content is restricted, location of the content (for example, file location, identification of a gallery for a painting), date content was entered into the affiliate management system, restrictions on use, and regulatory or compliance information. In preferred embodiments, an icon or thumbnail 34 (see FIG. 3) is created for each piece of content for display on a web page and stored in the storage medium. In some embodiments, some or all of the actual content is also stored in the storage medium and each entry in the content database 24 is associated with particular content.

Figure 3:
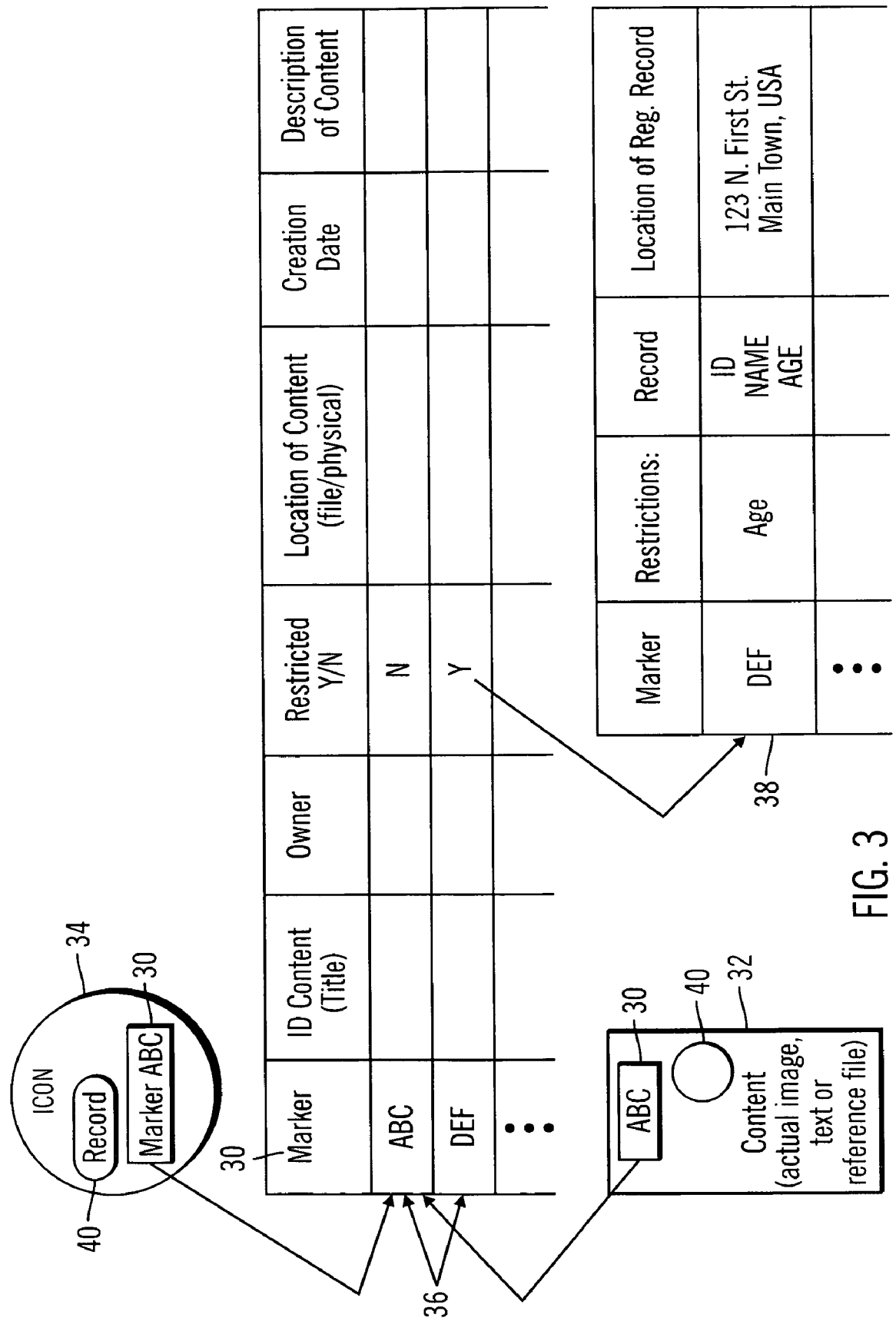
FIG. 3 is a diagrammatic representation of a stored database with links for accessing a portion of the database.

With reference to FIG. 3, the affiliate program manager associates the content with a tag or marker 30. The marker is a code or identification, such as an alphanumeric code or numeric code, which identifies the content. The marker is stored in the content database in association with the particular content information. The marker can be embedded into the content 32 and the icon 34 such that the information pertaining to the content is easily accessible. For each content entry 36, the database contains a variety of factors pertaining to the content. Some of the factors, include, but are not limited to, the identification or title of the content, description of the content, owner of the content, owner of the copyright, whether the content is restricted, location of the content (for example, file location, identification of a gallery for a painting), date content was entered into the affiliate management system, restrictions on use, and compliance or regulatory requirements.

Restrictions on the use of the content include any type of restriction, including but not limited to, user restrictions, such as, age limitations; distribution restrictions, such as, geographic limitations; requirements for payment to view or receive the content; limitations imposed by a license agreement, such as the distribution restrictions and the date of expiration of rights; and compliance or regulatory requirements. All of the restrictions or limitations on the use or distribution of the content are listed and stored in the content database in association with the identified content, or in a related database 38 that is linked to the content database and the relevant entry. Further, for content with regulatory requirements, information regarding the labeling (subject identification and age verification information) and the record keeping (identification of the custodian and location of the records for the content) are stored in association with the content. For content subject to the record keeping and labeling requirements, the managed affiliate program may insert a link or object 40 in the content that will be associated with a file that either identifies the record information, the location of the record, or both. Access to some of this information, such as the identities of the subjects, would be restricted to authorized personnel and law enforcement. However, the location of the records could be made available by right clicking on the image, for example.

As illustrated in FIG. 3, if the restrictions are stored in a related database 38, the restrictions are stored in association with the marker identified with the content. As evinced from the discussion above, the marker allows the managed affiliate system to identify authorized content, and further allows the system to identify whether the content is restricted or non-restricted as the marker links to the content database and information appurtenant to the content.

With reference again to FIG. 2, the membership database 26 is a database containing information regarding the participants of the managed affiliate system, and the associated web sites and URLs. The membership database 26 is stored in storage medium 25, and includes any type of information regarding the participant that is desired, including, but not limited to, the identification of the participant, identification of the participant's web sites and URLs, and the content on each URL.

The customer database 27 is a database containing information about users. The customer database 27 stores information for all users regardless of whether they independently access the managed affiliate system or are transferred via a participant computer 14. The customer database 27 is stored in storage medium 25, and includes any type of information regarding the user that is desired, including, but not limited to, the user's name, address, age or birth date, driver's license number, passport number, username and password. In addition to user information, the customer database 27 stores user payment information, including, but not limited to, credit card information, direct payment information, or checking information. The use's age and identification can be verified via third party databases, such as, the department of motor vehicles, credit cards, financial institutions, or by any other suitable means. User identification may be stored in association with the user's information in the customer database 27.

If a user accesses the managed affiliate system independently the user's identifying information and payment information is entered into the customer database 27 via a series of user interface pages, such as, web pages via the affiliate program manager. The interface pages couple the user to the managed affiliate system via the user computer 16. In preferred embodiments, the user interface is a series of user interface pages, such as web pages, wherein information is input via input boxes, although information can be input by any suitable means, including, but not limited to, pull-down menus, speech recognition means, telephone, personal digital assistant, and web TV. The collection of information on networks by interfaces is understood by those reasonably skilled in the art and will not be set forth in further detail.

The use rights manager 28 is a software program that is configured to verify whether content is authorized and to manage the lawful distribution of such content. The use rights manager verifies whether the content on a participant's web site, any new content placed on a participant's web site, or any changes made to the web site, are acceptable, including whether the new content includes compliance information such as record keeping or labeling requirements. As discussed below, after a participant's web site has been authorized, changes to the participant's web site prompt a review of the web site, and in some instances, a suspension of the web page, or web site. The review can be an automatic review performed by the computer, a review by a person, or a combination thereof. In preferred embodiments, if the use rights manager identifies a change on the web site, the managed affiliate system will attempt to identify whether the content is authorized. If the content is identified and authorized, no further action is taken. If the content cannot be identified, the use rights manager transmits a notice to the affiliate program manager 22 and the participant computer 14. In some embodiments, the web page, or entire web site is suspended pending further review. A visual review of the content can then be performed. If the content can be identified, the suspension is released.

In addition to verifying whether the content is authorized, in preferred embodiments, the use right manager also identifies whether the distribution of the content is in compliance with all restrictions, including governmental restrictions, discussed below. For example, the use rights manager 28 reviews user information associated with the user being transferred into the affiliate system. In preferred embodiments, and as is well known, user information is typically transferred as part of known communication protocols as the user is transferred from one web site, or computer system to another. This information is stored and reviewed by the use rights manager. The user information transferred with the user includes, but is not limited to, the user name, password, IP address of the user, and the participant's identification. Upon receipt of the user information, the use rights manager reviews the customer database to identify the user, and further ascertains whether the user is subject to any restrictions, such as, an age limitation or location restriction. In this regard, the user's general physical location is also determined and stored during the user's use of the affiliate system. Various methods for verifying the user's location are described in U.S. Pat. No. 6,154,172 entitled System And Process For Limiting Distribution of Information On A Communication Network Based On Geographic Location to Piccionelli, et al. and is incorporated herein by reference.

Based upon the restrictions and location of the user, the use rights manager controls the content made available to the user. In preferred embodiments, any restrictions placed on the user are ascertained prior to user activity, including entering any restricted portions of the affiliate system, or downloading any content. For instance, if the user is deemed age restricted, or location restricted, only content in compliance with these restrictions are presented to the user. Some preferred methods for controlling the distribution of content is described in U.S. Pat. No. 6,154,172 referenced above, and are incorporated herein by reference. For example, if the user is age restricted and the content is age restricted, the user will not be allowed access into any restricted areas or may be transmitted to an alternative web site. If the user's location imposes restrictions on the user, only content that is not prohibited in the user's location will be presented to the user. In some embodiments, restricted content will be substituted with other content, or a notice will be transmitted to the user computer indicating the restriction for the particular content. In some embodiments, notification regarding all restrictions on a user is transmitted to the affiliate program manager and the affiliate program manager restricts the presentation of prohibited content to the user.

Additionally, some content must be distributed in compliance with record keeping and labeling requirements. In some embodiments, it is intended that the record information be automatically copied and transferred with the content. In these embodiments, when the content is transferred, records maintained in accordance with the record keeping and labeling requirements imposed pursuant to 28 U.S.C. 2257 et seq., and 28 CFR 75 et seq. will be reviewed. If no record exists, or the content does not contain the information required pursuant to these requirements, or does not contain a notice identifying the custodian and location of these records, the content will be prohibited, and the suspension will not be removed.

Figure 4:
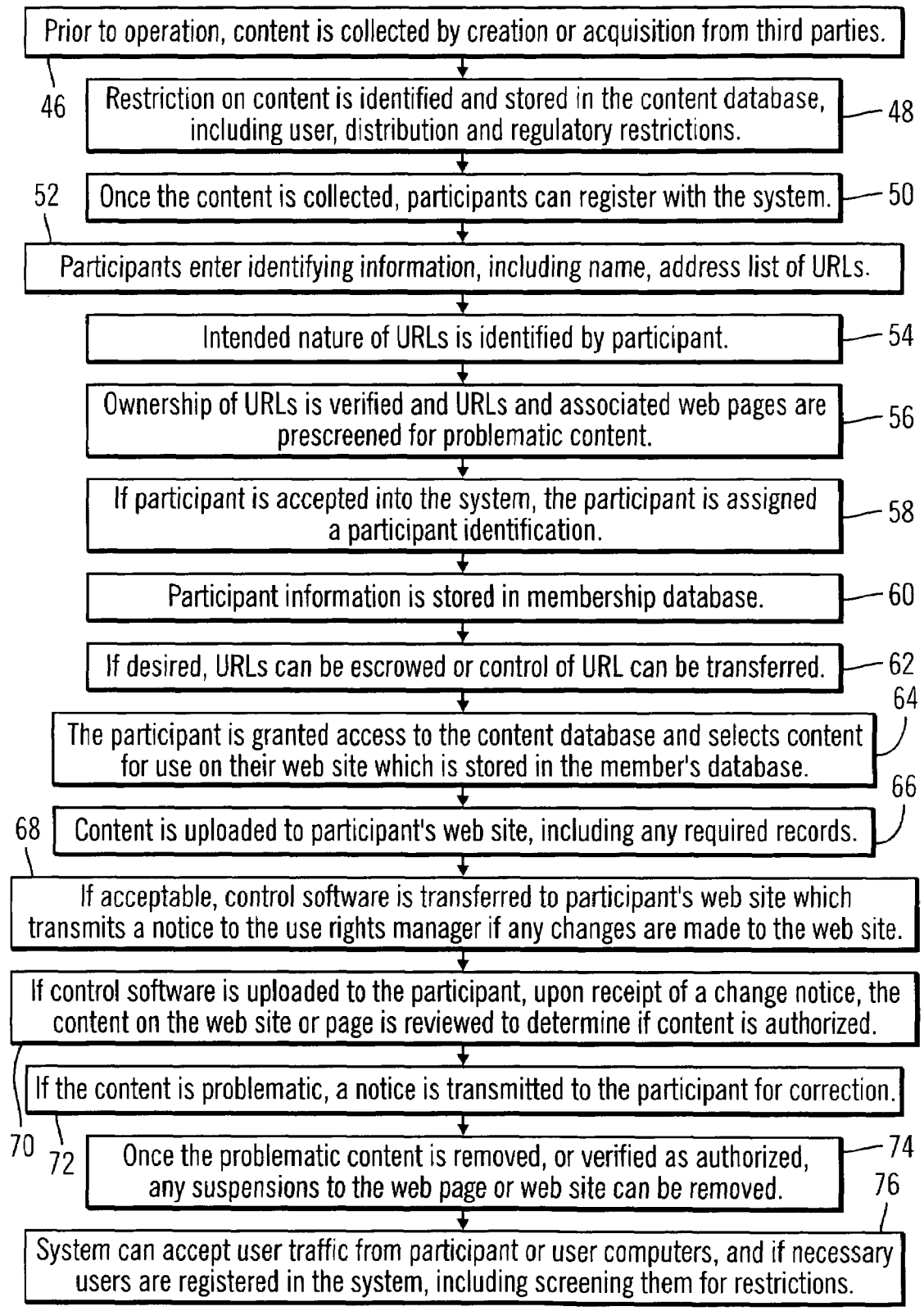
FIG. 4 is block diagram of a method for operating the managed affiliate system in accordance with preferred embodiments.

With reference to FIG. 4, prior to the use of the system, content must be collected for distribution 46. To populate the content database, content is created and collected. Content includes, but is not limited to, physical items, objects, text, digital files, photographs, videos, live transmissions, and the like. The creation of the content is by any suitable means including, but not limited to, photographing images, filming a movie, and creating an object such as a sculpture. Additionally, content can be obtained from third parties, including, but not limited to, purchasing the content or licensing the content. Further still, content resident on third party databases can also be included for use.

If the content is collected from third parties, the legitimacy of the ownership of the content or the use rights of the third party is verified. In some embodiments, a live representative, such as an attorney, reviews supporting documentation evincing ownership, or a license agreement granting the third party distributions rights or sublicensing rights.

Restrictions appurtenant to the content, for example, distribution or user restrictions, are identified 48 at the time of acquisition so that the distribution of the content can be controlled accordingly. Further, in some preferred embodiments, as stated above, some types of content are governed by regulatory requirements, which may have criminal consequences if there is a failure to comply with the regulations. In one preferred embodiment, some content is governed by the record keeping and labeling requirements pursuant to 28 U.S.C. 2257 et seq., and 28 CFR 75 et seq. The record keeping and labeling requirements provides that all persons in a photograph, video, live performance, and the like, be identified with specific types of identification and further requires proof of the age of majority for each subject at the time the photograph or video was produced, or the live performance occurred. Further, the custodian of the record, including the location of the records, must be identified with each piece of content, and may be required to be maintained with the content.

Once the content is collected or created, information pertaining to the content, including the record information and other distribution or user restrictions, is entered into the affiliate system via the affiliate program manager (discussed below) and is stored in the content database. In preferred embodiments, the content is in digital form, or can be converted to digital form, such as a movie, or a photograph. If the content is a non-digital object, a reference file is created to identify the non-digital object and is used to represent the content. For example, if a vase is being offered, the affiliate program manager creates an image of the vase, such as an icon 34, which is stored in the storage medium 25 as representative of the content. The actual content can be stored in the storage medium local to the service provider, or stored on a third party storage medium.

Once the content database is established, the system is ready for use and participants can register as a member of the managed affiliate program 50. Each participant operates at least one web site on a participant computer 14, each web site being identified by a Uniform Resource Locator ("URL"), commonly referred to as a domain name. The web site includes content, such as, photographs, videos, articles, live or substantially real-time transmissions, live performances, and other goods and services offered to a user, or for sale or lease to the user. The contents of the web site are not limited to items or services offered for sale, but can include information made available to users or items made freely accessible to users. To register for the managed affiliate program, the participant accesses a sign up page, such as, a web page or a series of web pages. Participant information is entered into the affiliate system via any suitable means, including, input boxes 52. Participant information includes, but is not limited to, participant name, physical address, name of business, a list of the URLs or domain names from which users (customers) will be forwarded.

In general, each listed URL entered by the participant identifies a top level domain name, such as, topdomain.com.

Figure 5:
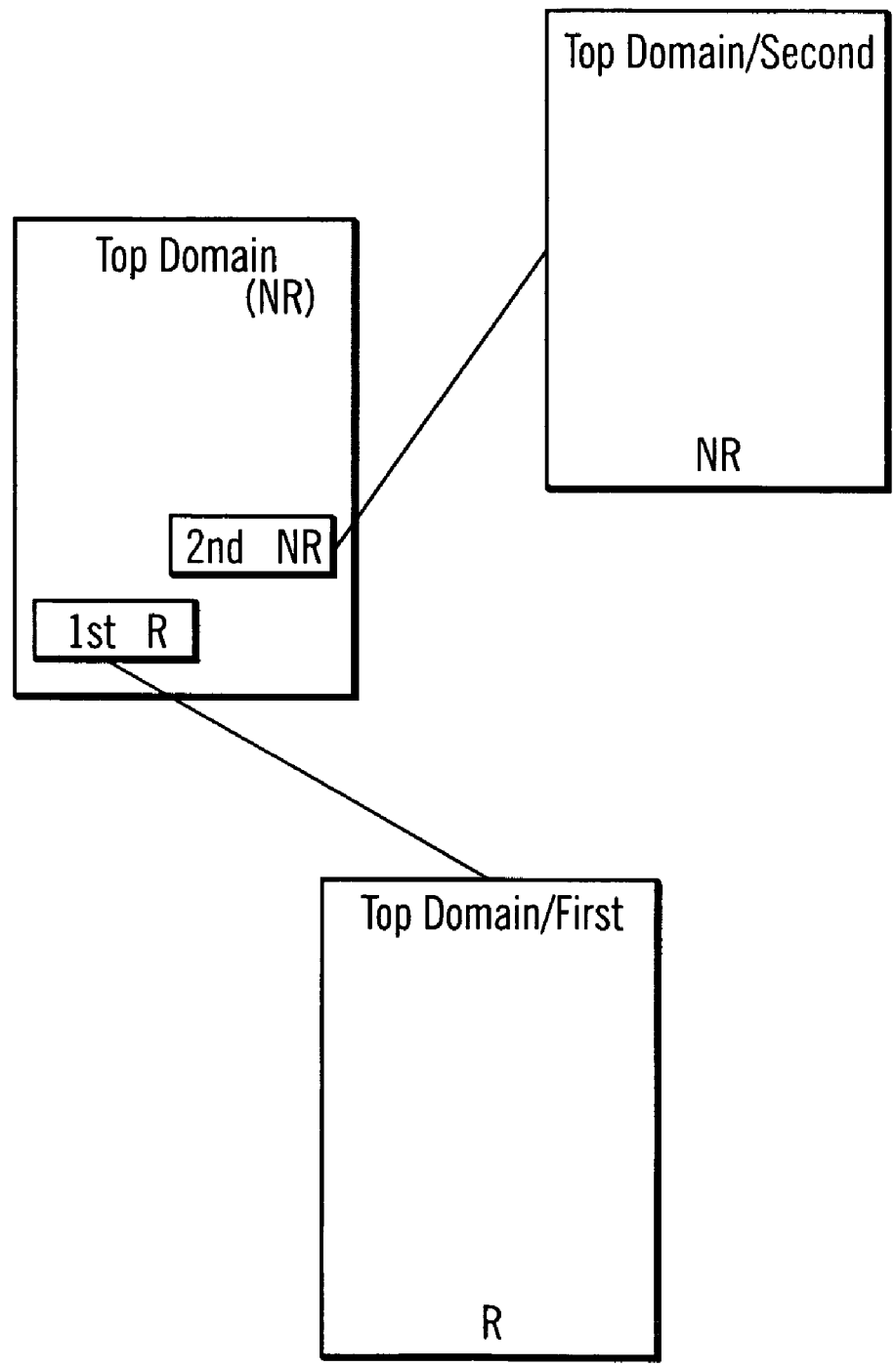
FIG. 5 is a schematic of restricted and non-restricted web pages representing URLs.

However, as is commonly understood by those reasonably skilled in the art, the top level domain name can be further divided into levels, such as, topdomain/firstlevel.com. With reference to FIG. 5, in addition to identifying each URL, the intended nature of the content for each section of each URL is identified; namely, each section of the URL is identified as being restricted (R) or non-restricted (NR) 54. For example, if the participant intends to charge a fee to enter a particular portion of the web site, or a particular URL, the URLs associated with the fee requirement will be identified as restricted. Since each URL is associated with a particular web page, the nature of the content on the web page is, therefore, predefined.

Once the participant information is entered, the affiliate system verifies the ownership of the URL, for example, by reviewing the registration information for the domain name registrations, such as the WHOIS information and prescreens the URLs and associated web pages for problematic content 56. For example, in some embodiments, the system searches the top level portion of the URL in known databases listing registered trademarks (for example, the United States Trademark Office database which contains a listing of pending and registered marks), and common law marks that are well known. For example, for the URL domainname.com, "domainname" would be searched.

Further, in addition to reviewing the URL, the web page associated with the URL is reviewed for identifiable terms or words that are known trademarks, or suspected trademarks. Notification is transmitted to the affiliate system regarding identical trademarks or trademarks that closely resemble the URL or a term on the web site. If a match, or near match is found, a determination is made as to whether the URL or a portion of the web site is potentially problematic. Further, if a URL is identified as non-restricted, the associated web page is reviewed to determine whether any words or terms contained on the page are inappropriate. For example, certain words or phrases may be considered harmful matter to children.

If all identified URLs are problematic, the participant is rejected. If only some of the URLs are problematic, the participant may still be accepted; however, the problematic URLs will be rejected. It is to be understood that the acceptance of a participant and the associated URLs is not necessarily completed at the time of registration. Indeed, in some preferred embodiments, a participant registers and then must wait for approval.

Once the participant is accepted by the affiliate system, the participant is assigned a participant identification 58. The participant identification is a code that identifies the participant and is coupled to information regarding the participant, including, but not limited to, the list of URLs. This code is appended to all traffic exiting the participant's web site which is directed to the affiliate system such that the affiliate system can track the amount of traffic emanating from a particular participant and credit any fees due from resulting sales to the participant's account. The input information and participant identification is stored in the membership database 60.

If the URLs appear to be acceptable, the participant may escrow or transfer control of each of the URLs to the managed affiliate system 62. In preferred embodiments, the participant maintains the ownership rights in the domain name; however, the control of the domain name is transferred to the use rights manager. In particular, the transfer of control allows the use rights manager to control whether the web site, in its entirety, or the web page associated with the URL can be deactivated such that users cannot access the web page, and further, can block traffic emanating from the domain name if problematic content is suspected or found on the web page.

Once the participant has registered with the managed affiliate program, the participant may be granted access to the content database 64. The participants are allowed to select the content they desire to upload to their web site for each of the listed URLs, wherein the selection of content for a particular URL is dependent upon the intended nature of the URL escrowed with the use rights manager. Each URL determines the type of content that can be displayed on the web page associated with the URL. For example, some content will be freely available for viewing. In contrast, other content will require that payment be made or identification be presented, for example, the presentation of a credit card. In some preferred embodiments, URLs associated with restricted areas are maintained behind a firewall, for example, requiring the presentation of a credit card to access URL, and are paired with content requiring restricted access. These URLs can also be paired with content that is not access restricted. URLs representing unrestricted areas are generally paired with content that is not access restricted.

If the selected content is governed by the record keeping and labeling requirements, the records appurtenant to the selected content will be transferred and automatically stored on the participant's local storage medium. If the record cannot be stored on the local storage medium, the transfer can be prohibited. Subsequent transfer of the content will automatically transfer the record information. In particular, if the content is transferred to a user, via the managed affiliate system directly, or a participant computer, the location and custodian information for the content can be transferred with the content automatically. The selected content is transferred to the participant computer 16 and uploaded to the web page associated with the URL, including any required records 66. The selection of content for each URL is stored in the member's database for future reference.

In some embodiments, prior to the transfer of the content to the participant, control software is installed on the participant's computer 68. The control software is configured to transmit notification to the use rights manager if any changes are made on the pages associated with the URLs once content is selected and stored on the web pages. A control flag is set, for example, to "off". If any changes are made to the web page(s), the control flag is automatically reset to "on" and the control software transmits notification to the use rights manager. In this regard, the use rights manager can monitor the participant's web pages to control the inclusion of illegal content.

In some embodiments, the control software is configured to identify the new content and does so by any suitable means. For example, the control software could compare the content on the URL with the list of content identifying the selected content for the URL. In other embodiments, the control software simply identifies that a change has occurred by identifying that the page has been updated.

Upon receipt of a change notification, the use rights manager reviews all of the content on the URL or simply any identified content to determine if the content is authorized 70. Since the approved content is transferred to the participant with the identification tags or markers, the use rights manager can identify authorized content by linking to the content database via the marker in the content. If the content is verified as known and allowable, the change is accepted and the flag indicating change is reset. If the content cannot be identified or is identified as problematic for example, is restricted and is resident in a non-restricted area, the use rights manager can bar all exit traffic directed to the affiliate system from the particular web page, or the entire site, or terminate all user access to the web page or site. A notice that problematic content exists on the URL is transmitted to the participant member to allow correction of the problem 72. Once a problem is corrected and verified as corrected, any restrictions placed on the URL or web site can be removed 74.

Once the managed affiliate program is operational, users can access the system via the participant's computer or the user computer 76. Users independently accessing the affiliate system can join the affiliate program as an end user. To join the affiliate program, the user registers with the affiliate system and receives a user identification. The registration process, in part, screens the user to determine whether any restrictions should be placed on the user. The user identification will enable the managed affiliate system to easily verify the user's identification and age, and to further determine whether the user is permitted to access the affiliate system or any portion of the affiliate system regardless of the manner in which the user accesses the affiliate program.

Figure 6:
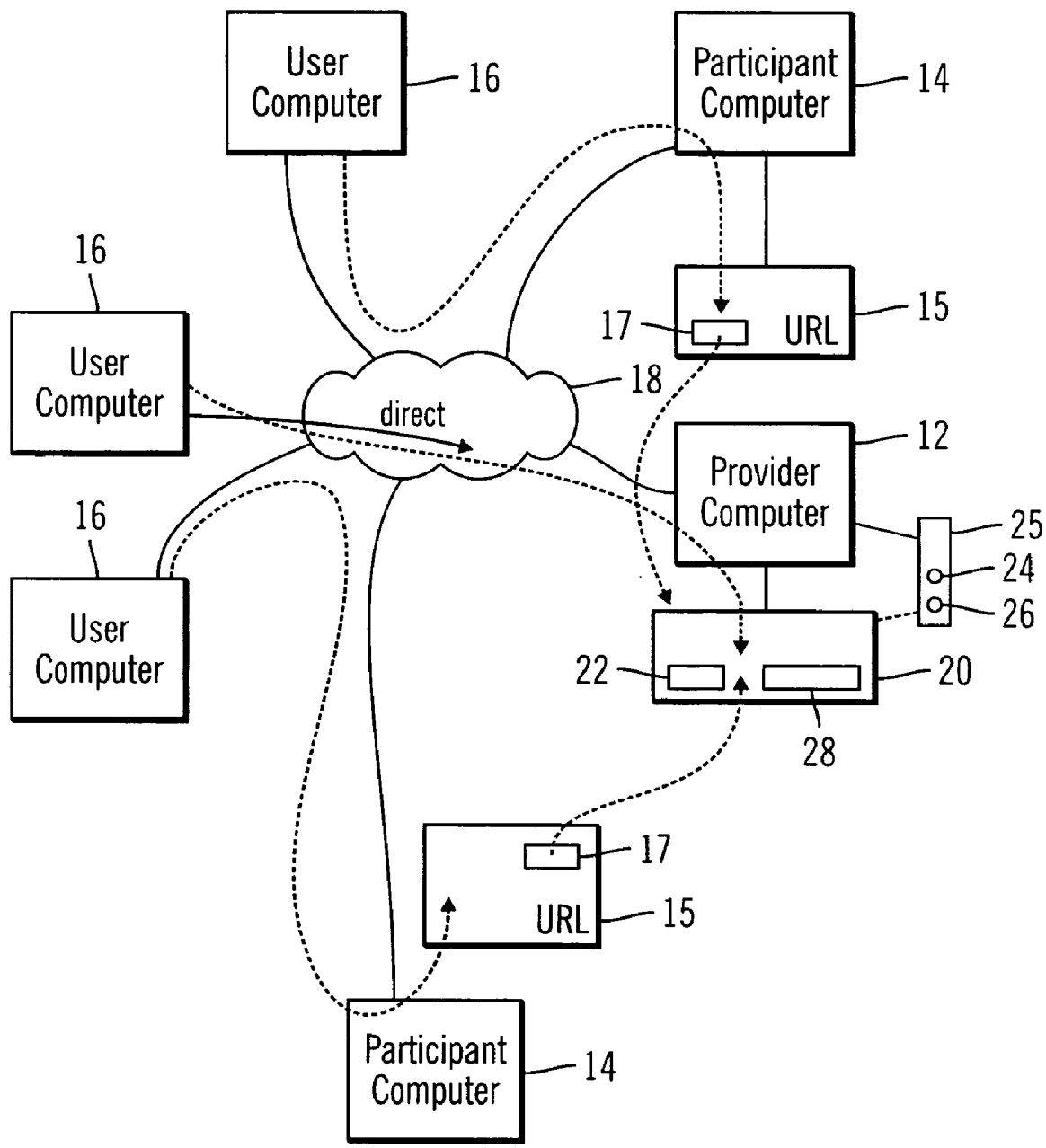
FIG. 6 is a schematic of the operation of the managed affiliate system.

With reference to FIG. 6, in operation, the user computer 16 accesses the participant computer 14 directly, or by means of a participating merchant, via the communication link 18. If the user computer accesses the participating computer, the use, accesses the participant's web site 15. Upon initial entry into the web site, the user is typically presented with non-restricted URLs unless the user has entered the restricted portion of the web site via any suitable means, including, a username and password, or via a credit card. In some embodiments, a link to the affiliate system or advertisement 17 for the affiliate system is placed on the web site. If the web site or particular URL has not been barred by the affiliate management system, when the user clicks on the link 17, the user is transmitted to the affiliate program via the link or advertisement 17. In other instances, the user is automatically transferred to the affiliate system or is presented with advertisements for the affiliate system when the user attempts to leave the merchant's web site. If the traffic forwarded to the managed affiliate system results in a sale to the user for content or services, the managed affiliate system will credit a fee to the participant computer 14, that is, the merchant. As stated above, the sale is associated with the merchant via the participant's identification that is transferred to the provider computer with the user's identifying information. If the user has accessed the affiliate program directly, no fee is paid as there is no referring merchant.

If a user accesses the affiliate system via the user computer, if the user is not a member of the affiliate system, the user must register with the managed affiliate system. At this time, user identification and age verification information is collected, such as a driver's license number. Additionally, payment information, such as a credit card number, is collected. The user identification and payment information is stored in the customer database for later use.

Regardless of the manner in which users are transferred, as users are transferred to the provider computer, the use rights manager 28 verifies user criteria for viewing or receiving materials. In all instances, the use rights manager can verify the user's location via the IP address of the originating request from the user computer, or by any other suitable means. Further, if the user has entered a restricted portion of the web site and entered via a user name and password, the user identification is transferred from the user computer. Additionally, other information, such as, geographic information can also be transferred at the same time. User information transmitted from the participant computer is stored in the consumer database for later use. If insufficient information is transferred to allow the managed affiliate system to determine whether the user can access the content, the managed affiliate system will request the information from the user via a series of interfaces. In all instances, the user's geographic location is temporarily stored for use by the use rights manager. If the user attempts to access user or distribution restricted content, for example, a copyrighted work having restricted geographic distribution, the use rights manager prevents the transmission of the content and transmits a notification to the user of the restriction.

It is to be understood that the above-described embodiments of the managed affiliate program are not intended to be limited to the embodiments described above. Indeed, in some embodiments, a more graduated management of the content could allow some types of restricted content into areas otherwise designated as unrestricted. For example, distinctions between location restricted content and user restricted content can be made. Indeed, location restricted content will not apply to entire groups of users, for example, users under the age of eighteen, whereas, user restricted content typically applies to a set of users, for example, users under the age of eighteen. Thus, content that is only distribution restricted could be managed differently from other restricted content. For instance, some distribution restricted content could be included on URLs representing unrestricted areas, wherein distribution of the content would only be restricted to identified prohibited locations. If the content could not be distributed to the user, a pre-selected image could replace the restricted content, or the restricted content could simply not be displayed. If a user specifically requests the content, for example, attempts to purchase an item that cannot be delivered to the user's location, a notice can be transmitted to the user stating the restriction on distribution. Similarly, if content requiring payment is resident on an unrestricted URL, the attempt to access or download the content could prompt a payment page to be displayed, wherein upon payment, the user would receive access to the content.

Further, in other embodiments, the managed affiliate system can include non-member participants, wherein the non-member participants grant some control of their URLs to the managed affiliate system. In particular, in some preferred embodiments, non-member third party web sites can also participate in the system without transferring control of their URLs. However, in these instances, the control software can be installed on non-member's web site, such that any changes to the portion of the web site identified with the URLs, once approved, can be monitored. These non-members are not fully within the control of the managed affiliate system and once approved, are deemed accredited non-members. If these non-members already have content on their web site, the content will be reviewed and approved. The non-members can also select content from the affiliate system. As with members, if any changes are made to the web site, notification is transmitted to the use rights manager and the content is reviewed. If the content is not acceptable, the non-member's web pages can be blocked from transmitting users. In other preferred embodiments, control software is not transferred and the accredited non-members simply attests that the web site and all its content are compliant with all applicable laws.

As stated above, this disclosure is not intended to be limiting. Rather, the foregoing is intended to cover all modifications and alternative constructions falling within the spirit and scope of the invention.

What is claimed is:

1. A method for providing an affiliate program on a computer network having a provider computer and a participant computer, wherein the provider computer and the participant computer are in communication therebetween, the provider computer having content for use on the participant computer on a participant web site, and wherein the affiliate program is configured to provide authorized content for use and distribution by the participant computer and provider computer, the method comprising:
- the affiliate program preauthorizing a set of content for use by the affiliate program;
- the affiliate program storing the set of preauthorized content in a content database on the provider computer;
- the affiliate program storing, on the provider computer, use restrictions in association with the set of preauthorized content;
- the affiliate program prescreening the participant web site for problematic content;
- the affiliate program confirming that distribution, to the participant computer, of the set of preauthorized content is in compliance with the use restrictions; and
- the affiliate program transferring at least a portion of the preauthorized content from the content database to the participant computer, for use on web pages of the participant web site, when the participant web site clears the prescreening process and when the participant computer is in compliance with the use restrictions;
- wherein after authorization of the content on the participant website, automatically and periodically reviewing changes to the content that take place on the participant website and verifying that the changes to the content are in compliance with the use restrictions.

2. A method as claimed in claim 1, further comprising:
- receiving registration information on the provider computer from the participant computer, the registration information including at least one uniform resource locator; and
- determining the acceptability of the uniform resource locator for participation in the affiliate program.

3. A method as claimed in claim 2, wherein the portion of transferred content is authorized for use on the uniform resource locator by the participant computer.

4. A method as claimed in claim 2, further comprising transferring control of the uniform resource locator to the provider computer.

5. A method as claimed in claim 2, wherein determining the acceptability of the uniform resource locator comprises comparing the uniform resource locator to a predefined set of use restricted terms.

6. A method as claimed in claim 2, further comprising defining for each uniform resource locator, by the participant computer, whether each uniform resource locator is to be associated with restricted or non-restricted content.

7. A method as claimed in claim 2, further comprising providing, to the user computer, access to the uniform resource locator.

8. A method as claimed in claim 2, further comprising restricting access to the uniform resource locator if the portion of preauthorized content on the participant website that is associated with the uniform resource locator has been altered, wherein altered content has not been authorized for use on the uniform resource locator by the provider computer.

9. A method as claimed in claim 1, further comprising approving, by the provider computer, the content for use on the participant computer.

10. A method as claimed in claim 1, the computer network further including a user computer, the user computer being in communication with the provider computer and the participant computer, wherein a user can access the participant computer or the provider computer via the user computer, the method further comprising:
- collecting user identification information and age verification information for the user, and storing the identification and age verification information in a customer database; and
- screening the user to determine the user's eligibility to access content on the affiliate program.

11. A method as claimed in claim 1, further comprising installing control software on the participant computer, the control software being configured to monitor the participant web site and notify the provider computer when the portion of preauthorized content used on the participant web site has been altered.

* * * * *

UNITED STATES PATENT AND TRADEMARK OFFICE
CERTIFICATE OF CORRECTION

PATENT NO. : 7,720,961 B2 Page 1 of 1
APPLICATION NO. : 11/029095
DATED : May 18, 2010
INVENTOR(S) : Levi et al.

It is certified that error appears in the above-identified patent and that said Letters Patent is hereby corrected as shown below:

Claim 1

Col. 13, line 4, Please delete "for use by the affiliate program".

Signed and Sealed this

Thirty-first Day of August, 2010

David J. Kappos
*Director of the United States Patent and Trademark Office*